United States Patent [19]

Nieder

[11] 3,993,541
[45] Nov. 23, 1976

[54] REMOVAL OF TRITIUM FROM GAS-COOLED NUCLEAR REACTORS

[75] Inventor: Rudolf Nieder, Julich-Barmen, Germany

[73] Assignee: Arbeitsgemeinschaft Versuchsreaktor Avr GmbH, Dusseldorf, Germany

[22] Filed: July 25, 1973

[21] Appl. No.: 382,556

[30] Foreign Application Priority Data
July 31, 1972 Germany............................ 2237506

[52] U.S. Cl. ........................... 176/37; 176/92 R
[51] Int. Cl.² .................... G21C 9/00; G21C 19/32
[58] Field of Search ............... 137/37; 176/38, 19, 176/92 R

[56] References Cited
UNITED STATES PATENTS

| | | | |
|---|---|---|---|
| 3,247,075 | 4/1966 | Ryon | 176/92 |
| 3,285,822 | 11/1966 | Ackroyd | 176/37 |
| 3,362,883 | 1/1968 | Wright | 176/37 |
| 3,658,996 | 4/1972 | Frumerman | 176/19 |

Primary Examiner—Samuel W. Engle
Assistant Examiner—Ralph Palo
Attorney, Agent, or Firm—Toren, McGeady and Stanger

[57] ABSTRACT

Tritium contained in the coolant gas in the primary circuit of a gas cooled nuclear reactor together with further tritium adsorbed on the graphite used as a moderator for the reactor is removed by introducing hydrogen or a hydrogen-containing compound, for example methane or ammonia, into the coolant gas. The addition of the hydrogen or hydrogen-containing compound to the coolant gas causes the adsorbed tritium to be released into the coolant gas and the tritium is then removed from the coolant gas by passing the mixture of coolant gas and hydrogen or hydrogen-containing compound through a gas purification plant before recirculating the coolant gas through the reactor.

14 Claims, 1 Drawing Figure

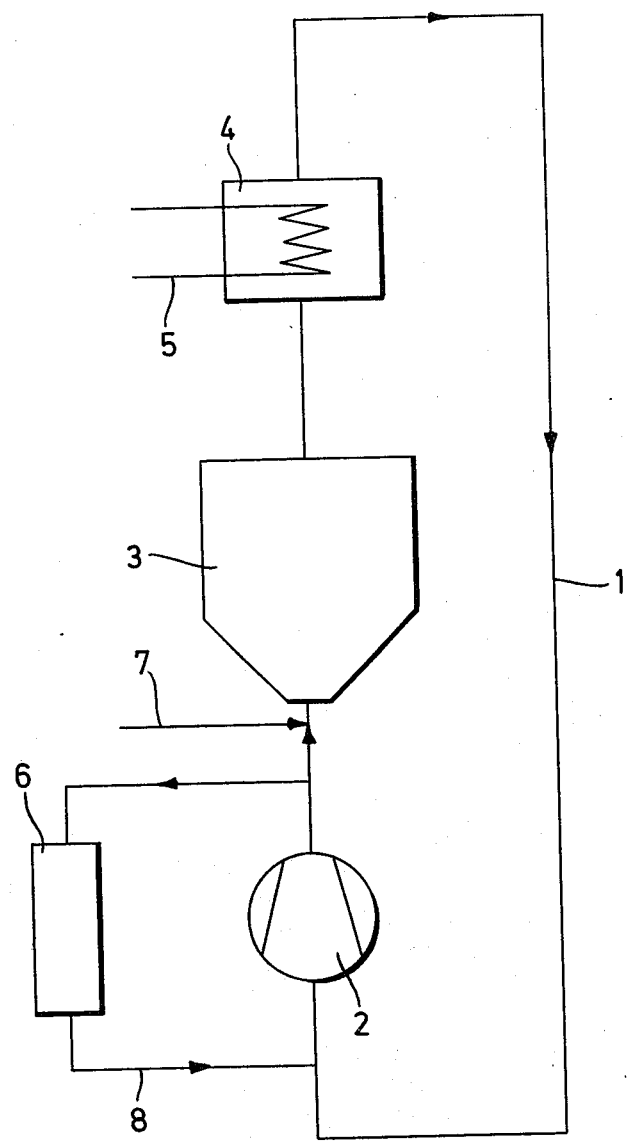

REMOVAL OF TRITIUM FROM GAS-COOLED NUCLEAR REACTORS

This invention relates to methods of removing tritium from the primary circuit of gas-cooled nuclear reactors.

In the primary circuits of all gas-cooled nuclear reactors the heavy hydrogen isotope tritium is present as a radioactive contaminant. It possesses a half-life of approximately 12.5 years and either occurs as a fission product or is produced by nuclear reactions, for example from helium or lithium.

Tritium possesses, in contrast to other radioactive contaminants usually present in the primary circuit, the property, especially at high temperatures such as those obtaining in gas-cooled reactors, of diffusing through metal walls and thus reaching other circuits. This leads to radioactive contamination, for example of the feedwater of gas-cooled nuclear power stations.

Tritium diffusion also occurs in molten salt reactors. Attempts have been made in these reactors, by special construction of the pipes and the use of special materials for these pipes, to keep the tritium diffusion to as low a level as possible. Thus for example it has been found that diffusion is impeded by an $Al_2O_3$ layer on the pipes. Use can also be made of the fact that tritium does not condense in liquid potassium, so that it is possible to carry out a complicated separation process on this basis. These techniques are however very expensive.

The object of the present invention is therefore to provide an economically acceptable method, capable of being applied to existing reactors without extensive reconstruction, which enables the tritium to be removed from the primary circuit before it can diffuse into other circuits.

According to this invention, a method of removing tritium from a primary circuit of a gas-cooled nuclear reactor comprises introducing hydrogen or a hydrogen-containing compound into cooling gas in the primary circuit and subsequently removing tritium from the mixture of cooling gas and hydrogen or hydrogen-containing compound.

This solution to the problem is based on the fact that in the operation of a gas-cooled reactor only a small portion of the tritium actually present is located in the coolant gas, whereas the larger part is chemically adsorbed, for example on the graphite used as moderator. In order therefore effectively to counteract the diffusion problem, it is necessary to recover the considerable quantities of tritium which are adsorbed on the graphite. This is achieved by the introduction of the hydrogen or hydrogen-containing compounds into the primary circuit. In this way the tritium absorbed on the graphite is released in considerable quantities. It is thought that this is caused by an exchange of chemically absorbed tritium taking place with the hydrogen.

Since the released tritium diffuses into the secondary circuit not spontaneously but only after an appreciable delay, there is sufficient time for removing the tritium, which is released from the graphite, out of the cooling gas by means of a gas purification plant. The introduction of hydrogen or hydrogen-containing compounds is therefore preferably carried out in an intermittent manner. A concentration of approximately 1000 to 5000 $\mu$ at. of hydrogen is preferably maintained for several hours in the primary circuit.

Although, in addition to hydrogen, various hydrogen-containing chemical compounds are suitable for use in the method in accordance with the invention, hydrocarbons especially methane, or ammonia are preferred. It is immaterial to the effect achieved by the invention whether liquid or gaseous compounds are utilized, but preference is given to the latter, because they are easier to introduce. The position in the primary circuit at which the compounds are introduced is also not critical, it being preferred, however, in order to improve the effectiveness, that the introduction should take place into the coolant gas before the latter enters the reactor core.

The tritium released by the introduction of hydrogen or a hydrogen-containing compound into the coolant gas can be removed from the coolant gas, for instance helium or $CO_2$, in a purification plant which is preferably incorporated in a by-pass. This may be effected, for example, by oxidation over copper oxide or catalytic combustion on contact with platinum with excess oxygen, the water produced being removed by driers such as molecular sieves, silica gel, or barium oxide.

An example of a method in accordance with the invention will now be described with reference to the accompanying drawing which shows diagrammatically the primary circuit of a gas-cooled nuclear reactor.

Coolant gas, for example helium or carbon dioxide, is pumped in a circuit 1 by means of a blower 2 through a core 3 containing graphite and gives up its heat in a steam generator 4 to a feed water circuit, that is to a secondary circuit 5. Downstream of the blower 2, a branch flow of the coolant gas is bled off and is purified in a gas purification plant 6 to remove its inactive and active impurities.

Hydrogen or hydrogen-containing gas is fed in through an inlet 7 and is thus supplied to the coolant gas before it enters the core. This can be carried out either continuously or intermittently. Depending upon the reactor size, provision is made to ensure that a concentration of approximately 1000 to 5000 $\mu$ at. of $H_2$ (or $CH_4$ for example) is present in the coolant gas for at least several hours. The coolant gas thus injected leads to a release in the core of the tritium adsorbed on the graphite in the core 3. This is then removed from the coolant gas in a by-pass 8 by means of a gas purification plant 6 in the by-pass. By these measures, namely the sufficiently frequent injection of hydrogen or a hydrogen-containing compound in conjunction with a gas purification plant of sufficient size for the throughput, it is possible to ensure in an advantageous manner that the graphite in the primary circuit is cleansed of tritium and the tritium concentration in the primary circuit is maintained at such a low level that its diffusion into the secondary circuit is prevented.

I claim:

1. In a method of operating a gas-cooled nuclear reactor having a core in which the heavy hydrogen isotope tritium is present as a radioactive contaminant, the reactor including a primary circuit for circulating a coolant gas through the core, said method including the step of cooling said core by circulating the coolant gas through the primary circuit including the core of said reactor, the improvement comprising removing tritium from said coolant gas in said primary circuit by the steps of introducing hydrogen or a hydrogen-containing compound into said coolant gas in said primary circuit and flowing the hydrogen or a hydrogen containing compound mixed with the coolant gas through said primary circuit including the core whereby tritium in said circuit and core is entrained in the mixture comprising said cooling gas and said hydrogen or hydrogen-containing compound and subsequently removing said tritium from said mixture.

2. A method as claimed in claim 1, wherein said hydrogen or said hydrogen-containing compound is introduced intermittently into said coolant gas in the primary circuit.

3. A method as claimed in claim 1, wherein a concentration of from about 1,000 to about 5,000 $\mu$ at. of hydrogen or hydrogen-containing gas is maintained for several hours in said coolant gas in said primary circuit.

4. A method as claimed in claim 1, wherein said hydrogen-containing compound is in the form of a hydrocarbon.

5. A method as claimed in claim 4, wherein said hydrocarbon is methane.

6. A method as claimed in claim 1, wherein said hydrogen-containing compound is ammonia.

7. A method as claimed in claim 1, wherein said hydrogen-containing compound is in gaseous phase.

8. A method as claimed in claim 1, wherein said hydrogen or said hydrogen-containing compound is introduced into said coolant gas before said coolant gas enters said core during said circulation of said gas.

9. A method as claimed in claim 1, wherein said tritium is removed from said mixture in a purification plant.

10. A method as claimed in claim 9, wherein said purification plant is incorporated in a by-pass of said primary circuit.

11. A method as claimed in claim 1, wherein the removal of tritium from the mixture is effected by withdrawing at least a portion of the mixture comprising cooling gas and said hydrogen or hydrogen-containing compound in which the tritium is entrained from said primary circuit and circulating the mixture through a purification plant for removing the tritium from the mixture and reintroducing the cooling gas into the primary circuit.

12. A method as claimed in claim 11, wherein the removal of the tritium is effected by oxidizing the tritium by passing the mixture containing the tritium over copper oxide.

13. A method as claimed in claim 11, wherein the removal of tritium is effected by catalytic combustion on contact with platinum with excess oxygen and removing water produced in the catalytic combustion.

14. In a method of operating a gas-cooled nuclear reactor having a core in which the heavy hydrogen isotope tritium is present as a radio-active contaminant and a closed primary circuit through which a coolant gas circulates, the core being located in the path of the primary coolant, the method including the step of cooling the core by circulating the cooling gas through the primary circuit including the core, the improvement comprising introducing hydrogen or a hydrogen-containing compound into a cooling gas in the primary circuit and circulating the mixture of the cooling gas and the hydrogen or hydrogen containing mixture through the core for removing tritium from the core, removing a portion of the mixture of the cooling gas and hydrogen or hydrogen containing compound from the primary circuit after the mixture has circulated through the core, removing tritium from the removed portion of the mixture and, after such removal, reintroducing the cooling gas back into the primary circuit.

* * * * *